United States Patent [19]
Hashida et al.

[11] Patent Number: 5,480,223
[45] Date of Patent: * Jan. 2, 1996

[54] FLUID PRESSURE CONTROL DEVICE

[75] Inventors: Koichi Hashida; Masato Yoshino, both of Itami, Japan

[73] Assignee: Sumitomo Electric Industries, Ltd., Osaka, Japan

[*] Notice: The portion of the term of this patent subsequent to Jul. 9, 2013, has been disclaimed.

[21] Appl. No.: 249,835

[22] Filed: May 26, 1994

[30] Foreign Application Priority Data

Jun. 3, 1993 [JP] Japan .................................. 5-133201

[51] Int. Cl.⁶ .................................. B60T 8/48; F15B 11/00
[52] U.S. Cl. .................................. 303/119.2; 303/114.3
[58] Field of Search .................................. 303/113.2, 113.3, 303/114.3, 115.2, 116.2, 117.1, 115.4, 115.5, 119.1, 119.2, 84.2

[56] References Cited

U.S. PATENT DOCUMENTS

| | | | |
|---|---|---|---|
| 4,419,642 | 12/1983 | Kramer et al. | 335/227 |
| 4,779,935 | 10/1988 | Kuwana et al. | 303/11 X |
| 4,812,777 | 3/1989 | Shirai | 303/14 |
| 4,966,248 | 10/1990 | Farr | 180/197 |
| 5,018,797 | 5/1991 | Takata | 303/117.1 |
| 5,127,435 | 7/1992 | Takata et al. | 137/596.17 |
| 5,181,534 | 1/1993 | Hashida et al. | 137/501 |
| 5,261,731 | 11/1993 | Yogo et al. | 303/116.1 |
| 5,375,506 | 12/1994 | Hashida et al. | 91/446 |

FOREIGN PATENT DOCUMENTS

| | | |
|---|---|---|
| 0085535 | 8/1983 | European Pat. Off. . |
| 0303470 | 2/1989 | European Pat. Off. . |
| 0369412 | 5/1990 | European Pat. Off. . |
| 0434092 | 6/1991 | European Pat. Off. . |
| 0441343 | 8/1991 | European Pat. Off. . |
| 4121471 | 1/1992 | Germany . |
| 4121470 | 1/1992 | Germany . |
| 3270270 | 11/1988 | Japan .................................. 303/115.4 |
| 3297156 | 12/1988 | Japan .................................. 303/115.4 |
| 1160766 | 6/1989 | Japan .................................. 303/115.4 |
| 3234987 | 10/1991 | Japan . |
| 3223578 | 10/1991 | Japan . |
| 2245323 | 1/1992 | United Kingdom ................ 303/115.4 |

OTHER PUBLICATIONS

*Bosche Technische Berichte*, vol. 7 (1980), Notebook 2, ISSN 0006–789, "Antiblockiersystem (ABS)", Lieber et al.

*Primary Examiner*—Josie A. Ballato
*Attorney, Agent, or Firm*—Sandler, Greenblum & Bernstein

[57] ABSTRACT

A fluid pressure control device comprising: an inlet valve which is provided in a supply path for connecting a fluid pressure apparatus and a fluid pressure source and is opened so as to increase fluid pressure of the fluid pressure apparatus; and an outlet valve which is provided in a discharge path for discharging working fluid from the fluid pressure apparatus and is opened so as to reduce the fluid pressure of the fluid pressure apparatus; wherein the inlet valve is formed by a solenoid selector valve effecting only a fully open operation and a fully closed operation; wherein the outlet valve is formed by a flow control valve in which one-to-one correspondence exists between quantity of drive current applied thereto and flow rate of the working fluid flowing therethrough.

2 Claims, 4 Drawing Sheets

FLUID PRESSURE CONTROL DEVICE

BACKGROUND OF THE INVENTION

The present invention generally relates to a fluid pressure control device for adjusting fluid pressure in fluid pressure apparatuses mounted on a motor vehicle, for example, a steering apparatus, a suspension apparatus and a brake apparatus and more particularly, to a brake fluid pressure control device such as a brake fluid pressure control device for traction control, in which control performance is improved by employing a flow control valve without incurring rise of production cost of the brake fluid pressure control device.

Conventionally, various flow control valves suitable for a brake fluid pressure control device have been developed. For example, the assignee assigned by the present inventors proposed a flow control valve of this kind in Japanese Patent Laid-Open Publication Nos. 3-223578 (1991) and 3-234987 (1991). In this known flow control valve, for example, a spool including an orifice accommodated slidably in a sleeve is urged by an electromagnet. Pressure difference between opposite sides of the orifice, which are communicated with an input port and an output port, respectively, is determined by urging force of this electromagnet and specifies flow rate at the orifice. Therefore, in this known flow control valve, when quantity of electric current supplied to the electromagnet is determined, flow rate of working fluid flowing from the inlet 1 port to the outlet port is determined. In other words, one-to-one correspondence exists between quantity of electric current supplied to the electromagnet and flow rate of working fluid.

As compared with a so-called "ON/OFF" type solenoid selector valve in which only a fully open operation and a fully closed operation are performed, this known flow control valve is advantageous in that since flow rate of working fluid can be controlled continuously by adjusting quantity of electric current supplied to the electromagnet, control performance can be improved and that operational noises are suppressed.

Meanwhile, U.S. Pat. No. 5,261,731 discloses a valve in which pressure difference between an inlet port and an outlet port can be adjusted continuously. This prior art valve includes a valve body establishing and cutting off communication between the inlet port and the outlet port and an electromagnet for urging the valve body. Thus, in this prior art valve, by establishing and cutting off communication between the inlet port and the outlet port through change of urging force of the electromagnet, pressure difference between inlet port and the outlet port can be controlled. However, in this prior art valve, when detection members for detecting pressures of the inlet port and the outlet port, respectively are not provided, quantity of electric current supplied to the electromagnet cannot be accurately set to a predetermined value for obtaining a desired pressure difference between the inlet port and the outlet port. On the contrary, in the known flow control valve referred to above, even when pressure difference between the inlet port and the outlet port is not detected, flow rate of working fluid is determined if quantity of electric current supplied to the electromagnet is determined. Thus, the above mentioned known flow control valve is more excellent in controllability than the above described prior art valve capable of continuously adjusting pressure difference between the inlet port and the outlet port.

However, in the known flow control valve, a current drive circuit for making electric current supplied to the electromagnet variable is required to be provided and is more expensive than a general voltage drive circuit for driving the solenoid selector valve. Therefore, if both an inlet valve and an outlet valve of the fluid pressure control device are each formed by the known flow control valve, production cost of the fluid pressure control device as a whole rises undesirably.

SUMMARY OF THE INVENTION

Accordingly, an essential object of the present invention is to provide, with a view to eliminating the drawbacks inherent in conventional fluid pressure control devices, a fluid pressure control device in which improvement of control performance through employment of a flow control valve is achieved at relatively low cost.

In order to accomplish this object of the present invention, a fluid pressure control device according to the present invention comprises: an inlet valve which is provided in a supply path for connecting a fluid pressure apparatus or a control chamber for indirectly adjusting fluid pressure of the fluid pressure apparatus and a fluid pressure source and is opened so as to increase the fluid pressure of the fluid pressure apparatus or the control chamber; and an outlet valve which is provided in a discharge path for discharging working fluid from the fluid pressure apparatus or the control chamber and is opened so as to reduce the fluid pressure of the fluid pressure apparatus or the control chamber; wherein the inlet valve is formed by a solenoid selector valve effecting only a fully open operation and a fully closed operation; wherein the outlet valve is formed by a flow control valve in which one-to-one correspondence exists between quantity of drive current applied thereto and flow rate of the working fluid flowing therethrough.

Specifically, the above mentioned fluid pressure control device is, for example, a traction control type fluid pressure control device in which duration of step of reducing fluid pressure is longer than that of step of increasing fluid pressure and highly accurate control should be performed.

In the present invention of the above described arrangement, the inlet valve formed by the solenoid selector valve is opened and the outlet valve formed by the flow control valve is closed at the time of increase of fluid pressure of the fluid pressure apparatus or the control chamber. On the other hand, at the time of reduction of fluid pressure of the fluid pressure apparatus or the control chamber, the inlet valve is closed and the outlet valve is opened. In the flow control valve, one-to-one correspondence exists between quantity of drive current applied thereto and flow rate of working fluid flowing therethrough at this time. Furthermore, at this time, since the outlet valve is formed by the flow control valve, operational noises of the outlet valve are small.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
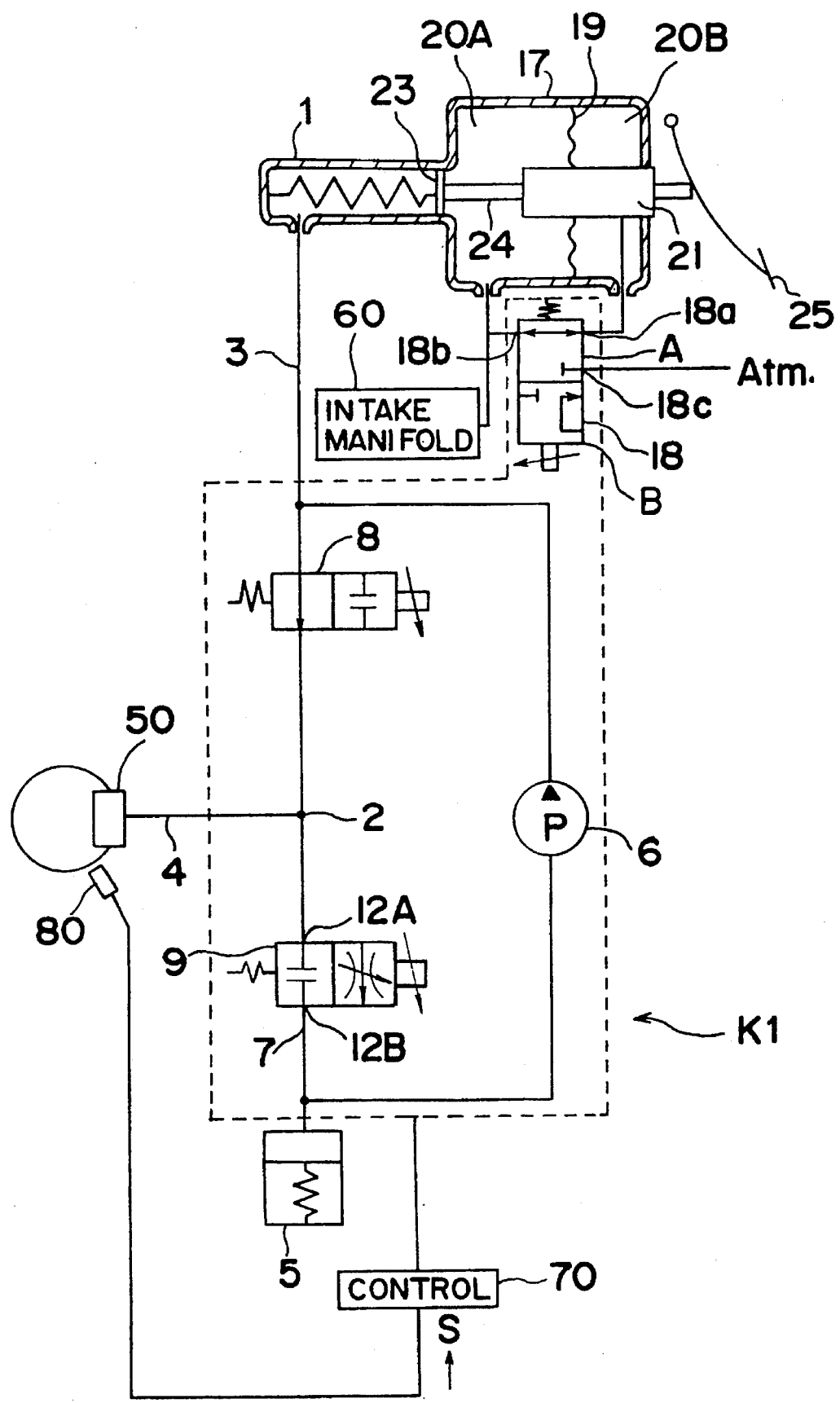
FIG. 1 is a schematic view of a fluid pressure control device according to a first embodiment of the present invention.

Referring now to the drawings, there is shown in FIG. 1, a brake fluid pressure control device K1 for traction control of a motor vehicle, according to a first embodiment of the present invention. The brake fluid pressure control device K1 is of a type in which fluid pressure of a wheel brake 50 acting as a fluid pressure apparatus is directly adjusted. The brake fluid pressure control device K1 includes a master cylinder 1 acting as a fluid pressure source, a branch point 2 and a supply path 3 for connecting the master cylinder 1 and the branch point 2. A flow path 4 leading to the wheel brake 50 is connected with the branch point 2 and a discharge path 7 is connected with the branch point 2 so as to return to the master cylinder 1 through a reservoir 5 and a pump 6.

An inlet valve 8 is provided in the supply path 3 and is formed by a normally open solenoid valve for performing only a fully open operation and a fully closed operation. On the other hand, an outlet valve 9 is provided between the branch point 2 and the reservoir 5 of the discharge path 7 and is formed by a normally closed flow control valve capable of continuously changing flow rate in accordance with drive current. By providing a plurality of the inlet valves 8 and the same number of the outlet valves 9 between the supply path 3 and the reservoir 5, wheel brakes 50, which are identical in number to the respective inlet valves 8 and outlet valves 9, can be independently controlled.

Figure 2:
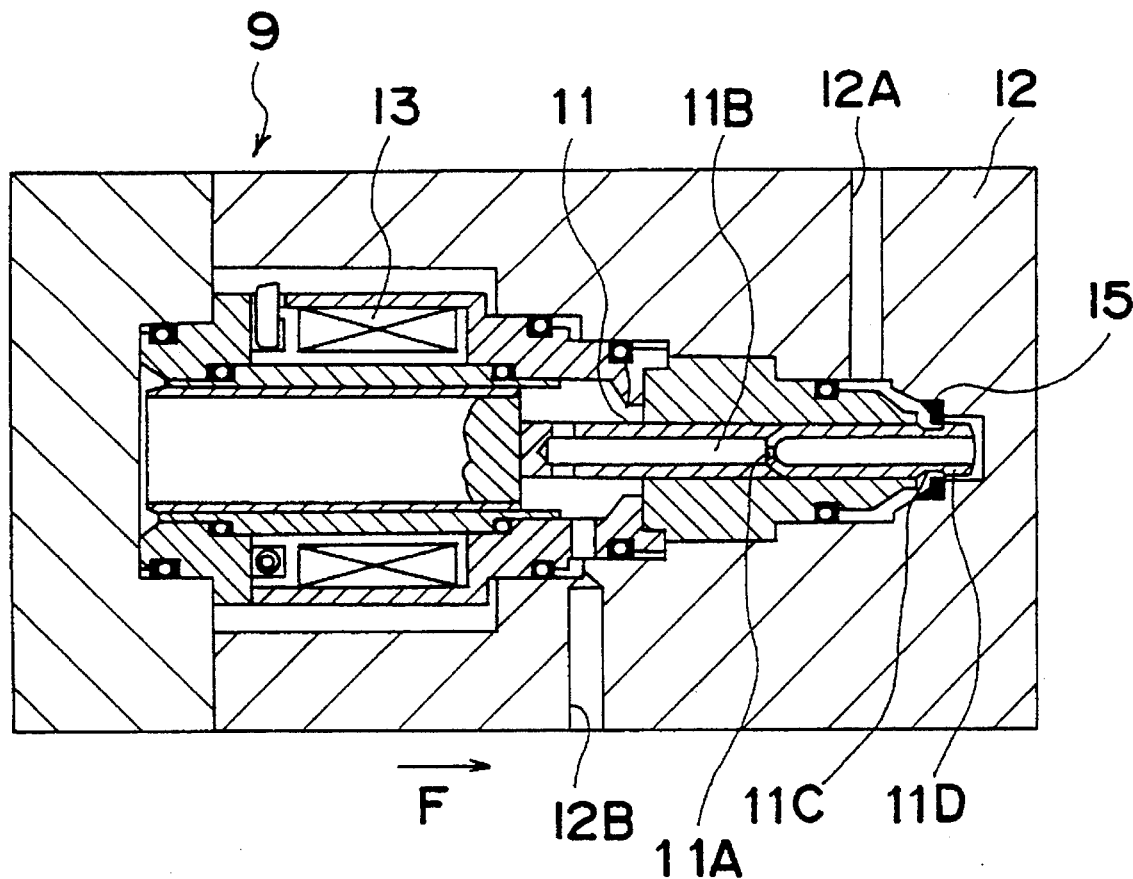
FIG. 2 is a schematic sectional view of a flow control valve employed in the fluid pressure control device of FIG. 1.

As shown in FIG. 2, the outlet valve 9 includes a spool 11 in which a flow path 11B having an orifice 11A is formed. The spool 11 is slidably accommodated in a sleeve 12 so as to be urged in the direction of the arrow F by an electromagnet 13. In the flow path 11B, opposite sides of the orifice 11A are, respectively, communicated with an inlet port 12A and an outlet port 12B. Thus, flow rate at the orifice 11A, namely, flow rate from the inlet port 12A to the outlet port 12B is determined by pressure difference between the opposite sides of the orifice 11A and this pressure difference is determined by urging force of the electromagnet 13.

Meanwhile, an outer peripheral groove 11C is formed on an outer periphery of the spool 11 and an annular sealing member 15 is fitted around the outer peripheral groove 11C. When a shoulder portion 11D of the spool 11 is brought into and out of close contact with the sealing member 15 so as to cut off and establish communication between the inlet port 12A and the flow path 11B, respectively, a flow control orifice for maintaining pressure difference between the opposite sides of the orifice 11A is formed.

Therefore, in the outlet valve 9, when quantity of drive current supplied to the electromagnet 13 is determined, flow rate of working fluid flowing from the inlet port 12A to the outlet port 12B is determined. Accordingly, by adjusting quantity of drive current supplied to the electromagnet 13, flow rate of working fluid flowing from the inlet port 12A to the outlet port 12B can be controlled continuously. In other words, in the outlet valve 9, one-to-one correspondence exists between quantity of drive current applied to the electromagnet 13 and flow rate of working fluid flowing from the inlet port 12A to the output port 12B.

As shown schematically in FIG. 1, the master cylinder 1 includes a vacuum booster 17 and an atmospheric pressure selector valve 18. The vacuum booster 17 is of a known construction and has first and second chambers 20A and 20B which are separated from each other by a partition wall 19. The partition wall 19 is movable rightwards and leftwards in FIG. 1 while maintaining hermetic state between the first and second chambers 20A and 20B. Meanwhile, an air valve 21 is integrally attached to the partition wall 19 and is coupled with a shaft 24 mounted on a piston 23 of the master cylinder 1.

In accordance with relation between displacement of the air valve 21 itself and kicking stroke of a brake pedal 25, the air valve 21 performs changeover between a state in which the second chamber 20B is connected with a first port 18a of the atmospheric pressure selector valve 18 and a state in which the second chamber 20B is connected with atmosphere. Namely, in a state where the brake pedal 25 is not being kicked, the air valve 21 connects the second chamber 20B with the first port 18a. On the other hand, in a state where the brake pedal 25 is being kicked, the air valve 21 communicates the second chamber 20B with atmosphere.

Meanwhile, the first chamber 20A is connected with an intake manifold 60 of an engine at all times, so that the first chamber 20A and the intake manifold 60 are held at an identical pressure at all times.

The atmospheric pressure selector valve 18 is formed by a three-port and two-position solenoid selector valve which includes the first port 18a communicated with the air valve 21, a second port 18b connected with the intake manifold 60 of the engine and a third port 18c communicated with atmosphere. At the time of de-energization, the atmospheric pressure selector valve 18 is set to a position A in which the first and second ports 18a and 18b are connected with each other and the third port 18c is shut off. Meanwhile, at the time of energization, the atmospheric pressure selector valve 18 is set to a position B in which the first and third ports 18a and 18c are connected with each other and the second port 18b is shut off.

The inlet valve 8, the outlet valve 9 and the atmospheric pressure selector valve 18 are controlled by a controller means 70 for detecting slip tendency of the wheels on the basis of signals S from a wheel speed sensor 80. This controller means 70 includes two voltage drive circuits for driving the inlet valve 8 and the atmospheric pressure selector valve 18, respectively and a current drive circuit for driving the outlet valve 9. By adjusting variable drive current supplied to the electromagnet 13 of the outlet valve 9 by this current drive circuit, it is possible to adjust urging force of the electromagnet 13.

In the first embodiment referred to above, since only the outlet valve 9 is formed by a flow control valve and the inlet valve 8 is formed by a solenoid selector valve, the controller means 70 may be provided with only one relatively expensive current drive circuit for driving the outlet valve 9, thereby resulting in reduction of production cost of the brake fluid pressure control device K1.

Hereinbelow, operation of the brake fluid pressure control device K1 of the above described arrangement is described. Initially, when the motor vehicle is not subjected to traction control, namely, when the controller means 70 does not detect slip tendency of the wheels, the inlet valve 8 is opened and the outlet valve 9 is closed such that working fluid is supplied to the wheel brake 50 via the supply path 3 and the flow path 4 in accordance with kicking stroke of the brake pedal 25.

On the other hand, when the motor vehicle is subjected to traction control, namely, when the controller means 70 has detected slip tendency of the wheels, the atmospheric pressure selector valve 18 is set to the position B and thus, atmospheric pressure is introduced into the second chamber 20B of the vacuum booster 17. By pressure difference between the second chamber 20B and the first chamber 20A communicated with the intake manifold 60 of the engine, the air valve 21 is displaced together with the partition wall 19 leftwards in FIG. 1. As a result, even if a driver does not fully kick the brake pedal 25, the piston 23 of the master cylinder 1 is moved leftwards in FIG. 1 and thus, fluid pressure is generated. This fluid pressure at the time of traction control of the motor vehicle is supplied to the wheel brake 50 through the supply path 3 and the flow path 4.

When slip tendency of the wheels is on the wane by braking operation at the time of traction control of the motor vehicle, the inlet valve 8 is closed and the outlet valve 9 is opened. Therefore, working fluid from the wheel brake 50 is discharged to the reservoir 5 and working fluid in the reservoir 5 is returned to the master cylinder 1 by driving the pump 6. At the time of this pressure reduction, since the outlet valve 9 is formed by a flow control valve, flow rate of working fluid discharged from the wheel brake 50 can be controlled continuously and operational noises are small in comparison with a case in which the outlet valve 9 is formed by a solenoid selector valve.

When fluid pressure of the wheel brake 50 drops by the pressure reducing operation referred to above, the outlet valve 9 is closed and the inlet valve 8 is opened and the atmospheric pressure selector valve 18 is set to the position A. As a result, the motor vehicle is again set to a state in which the motor vehicle is not subjected to traction control.

Figure 3:
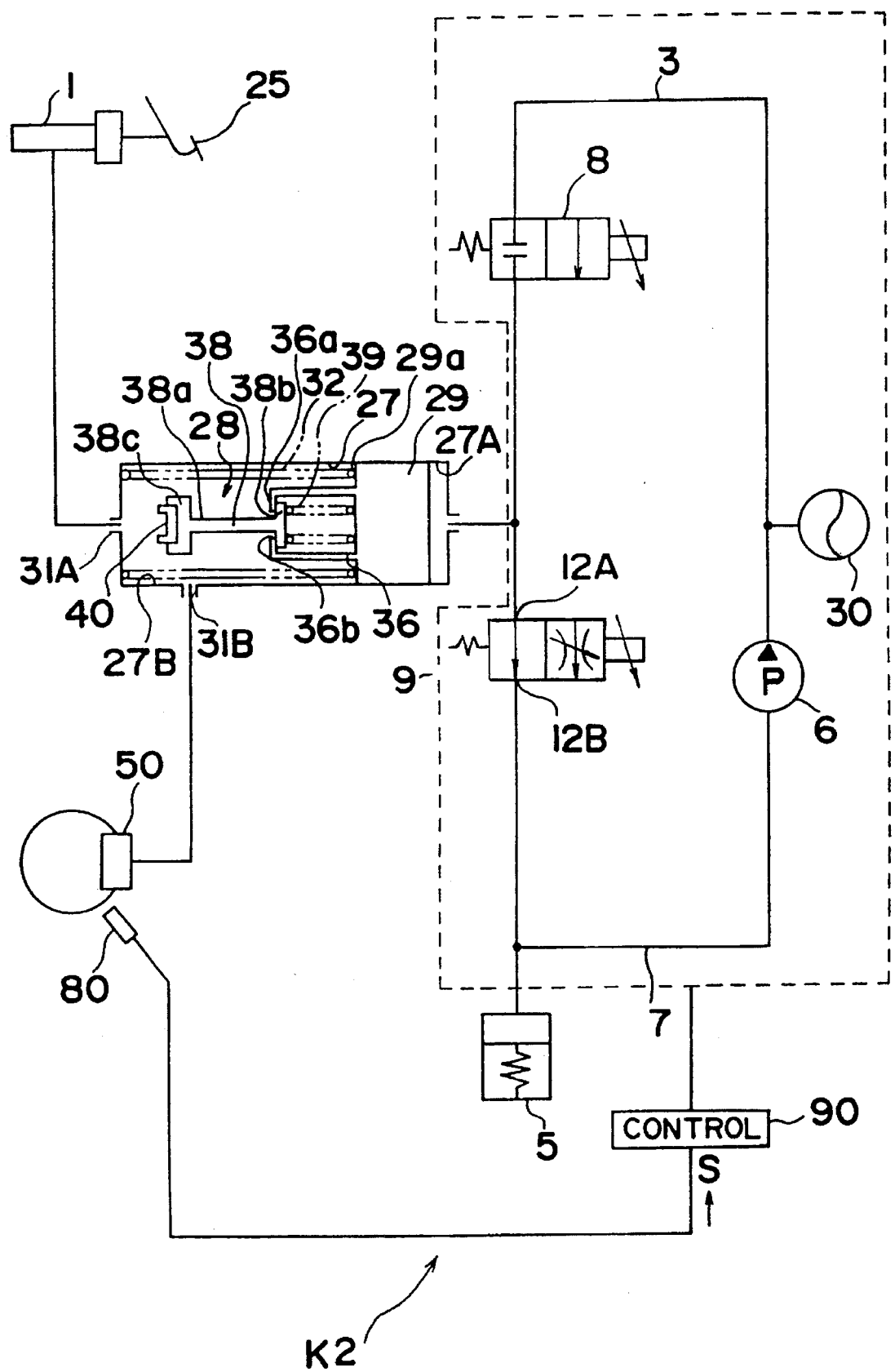
FIG. 3 is a schematic view of a fluid pressure control device according to a second embodiment of the present invention.

FIG. 3 shows a brake fluid pressure control device K2 for traction control of a motor vehicle, according to a second embodiment of the present invention. The brake fluid pressure control device K2 is of a type in which braking force of a wheel brake 50 is adjusted indirectly. In this embodiment, a control chamber 27 is provided between a master cylinder 1 and the wheel brake 50. A shut-off valve 28 having a valve body 38 and a second spring 39 to be described later is provided in the control chamber 27 so as to establish and cut off communication between the master cylinder 1 and the wheel brake 50. A piston 29 is slidably fitted into the control chamber 27 so as to separate the control chamber 27 into first and second portions 27A and 27B in fluid-tight state. A supply path 3 connected with an accumulator 30 acting as a fluid pressure source and a discharge path 7 for returning to the accumulator 30 working fluid discharged from the first portion 27A of the control chamber 27 are connected with the first portion 27A.

An inlet valve 8 is provided in the supply path 3 and is formed by a normally closed solenoid selector valve. On the other hand, an outlet valve 9 is provided in the discharge path 7 and is formed by a flow control valve. Furthermore, a reservoir 5 and a pump 6 are provided in the discharge path 7. A first port 31A leading to the master cylinder 1 is provided at one end of the second portion 27B of the control chamber 27. Meanwhile, a second port 31B leading to the wheel brake 50 is provided on a periphery of the second portion 27B.

Meanwhile, a first compression spring 32 is provided in the second portion 27B so as to urge the piston 29 rightwards in FIG. 3. A hollow cage 36 is formed integrally with a left end face 29a of the piston 29 and an opening 36b is formed at the center of an end portion 36a of the cage 36. A large-diameter spring receiver 38b, which is provided at one end of a rodlike portion 38a of the valve body 38, is disposed in the cage 36. A second compression spring 39 is provided between the spring receiver 38b and the end face 29a of the piston 29 such that the rodlike portion 38a of the valve body 38 protrudes out of the opening 36b of the cage 36. Size of the spring receiver 38b is so set as to be larger than that of the opening 36b such that the spring receiver 38b is retained at the end portion 36a of the cage 36 by urging force of the second compression spring 39.

Meanwhile, a large-diameter sealer holder 38c is provided at the other end of the rodlike portion 38a of the valve body 38 and a sealer 40 made of elastic material is attached to the sealer holder 38c.

In the second embodiment, the piston 29 is displaced by imbalance between rightward force in FIG. 3 produced by urging force of the first compression spring 32 and fluid pressure in the second portion 27B of the control chamber 27 and leftward force in FIG. 3 produced by fluid pressure in the first portion 27A of the control chamber 27. In response to displacement of the piston 29, the sealer 40 of the valve body 38 opens and closes the first port 31A such that communication between the master cylinder 1 and the wheel brake 50 is established and cut off by the shut-off valve 28.

The inlet valve 8 and the outlet valve 9 of the second embodiment are driven by a voltage drive circuit and a current drive circuit of a controller means 90.

Hereinbelow, operation of the brake fluid pressure control device of the above described arrangement is described. Initially, when the motor vehicle is not subjected to traction control, namely, when the controller means 90 does not detect slip tendency of the wheels, the inlet valve 8 is closed and the piston 29 is held at an inoperative position, i.e. a right end position in FIG. 3 by urging force of the first compression spring 32. In this state, the shut-off valve 28 is opened and thus, the master cylinder 1 and the wheel brake 50 are communicated with each other by way of the second chamber 27B of the control chamber 27.

On the other hand, when the motor vehicle is subjected to traction control, namely, when the controller means 90 has detected slip tendency of the wheels, the outlet valve 9 is closed and the inlet valve 8 is opened. Thus, working fluid of the accumulator 30 is supplied to the first portion 27A of the control chamber 27 so as to raise fluid pressure in the first portion 27A. By this rise of fluid pressure in the first portion 27A, the piston 29 is displaced leftwards in FIG. 3 against urging force of the first compression spring 32 and thus, the sealer 40 of the valve body 38 closes the first port 31A such that communication between the master cylinder 1 and the wheel brake 50 is cut off.

When fluid pressure of the first portion 27A is further raised, the piston 29 is further displaced leftwards in FIG. 3 while compressing the second compression spring 39 so as to reduce volume of the second portion 27B. Therefore, working fluid is supplied from the second portion 27B to the wheel brake so as to actuate the wheel brake 50.

When slip tendency of the wheels is on the wane by braking operation at the time of traction control of the motor vehicle, the inlet valve 8 is closed and the outlet valve 9 is opened. Thus, working fluid of the first portion 27A is discharged to the reservoir 5 and working fluid in the reservoir 5 is returned to the accumulator 30 by driving the pump 6. At the time of this pressure reduction, since the outlet valve 9 is formed by a flow control valve, flow rate of working fluid discharged from the wheel brake 50 can be controlled continuously and operational noises are small as compared with a case in which the outlet valve 9 is formed by a solenoid selector valve.

When fluid pressure of the wheel brake 50 drops by the above mentioned pressure reducing operation, the inlet valve 8 and the outlet valve 9 are closed such that the motor vehicle is again set to a state in which the motor vehicle is not subjected to traction control.

Also in the second embodiment, since the inlet valve 8 is formed by a solenoid selector valve and the outlet valve 9 is formed by a flow control valve, the controller means 90 may be provided with only one expensive current drive circuit for driving the outlet valve 9, thereby resulting in reduction of production cost of the brake fluid pressure control device K2.

Figure 4:
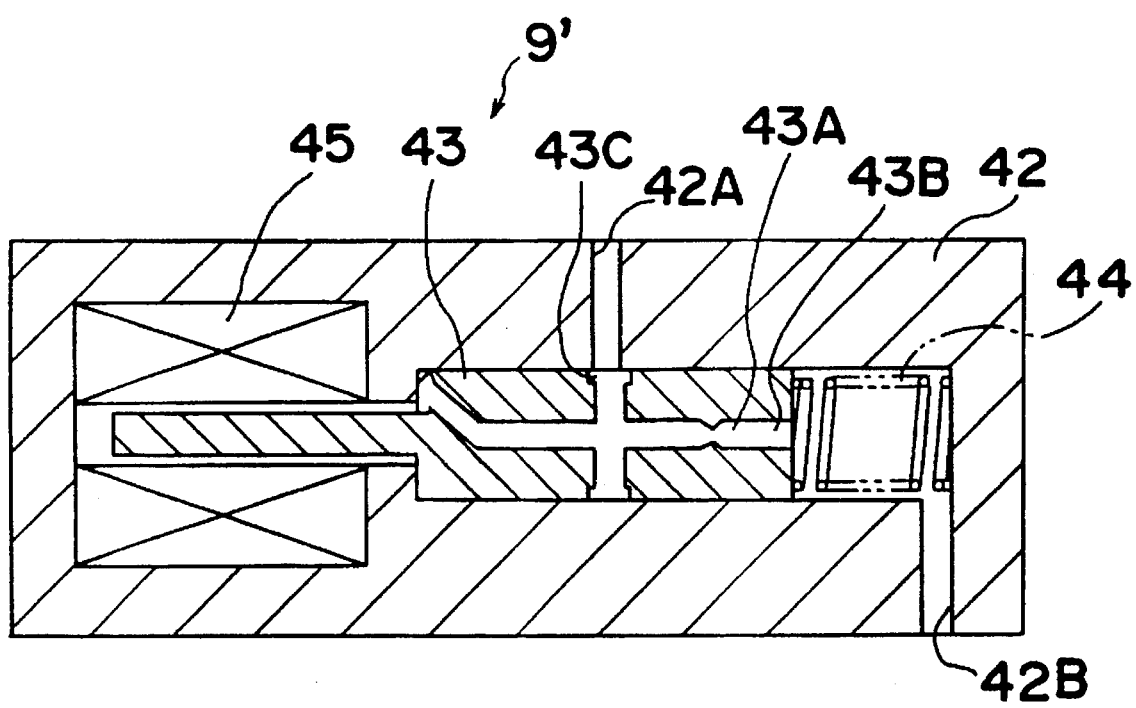
FIG. 4 is a view similar to FIG. 2, particularly showing its modification.

Meanwhile, the present invention is not restricted to the above described first and second embodiments and can be modified variously. For example, the outlet valve 9 shown in FIG. 2 may be replaced by an outlet valve 9' shown in FIG. 4. In the outlet valve 9' of FIG. 4, a spool 43 formed with a flow path 43B having an orifice 43A is urged in a sleeve 42 by a spring 44 and an electromagnet 45. A passage 43C is also formed on an outer periphery of the spool 43 so as to be communicated with the flow path 43B.

The sleeve 42 is formed with not only an inlet port 42A which is communicated with the flow path 43B through the passage 43C but an outlet port 42B which is communicated with the flow path 43B at one side of the orifice 43A opposite to that of the inlet port 42A.

In the outlet valve 9', when formation and cut-off of communication between the inlet port 42A and the passage 43C are repeated by sliding the spool 43 in the sleeve 42, a flow control orifice is formed. Therefore, if quantity of electric current supplied to the electromagnet 45 is determined, flow rate of working fluid is also determined. Therefore, by adjusting quantity of electric current supplied to the electromagnet 45, flow rate of working fluid can be controlled continuously. In other words, in the outlet valve 9', one-to-one correspondence exists between quantity of electric current supplied to the electromagnet 45 and flow rate of working fluid.

Furthermore, in the above embodiments, the present invention is directed to the brake fluid pressure control device for traction control of the motor vehicle. However, the present invention is not restricted to the brake fluid pressure control device for traction control of the motor vehicle but can be generally applied to a fluid pressure control device in which duration of step of reducing fluid pressure is longer than that of step of increasing fluid pressure or extremely sophisticated control is required to be performed. For example, the present invention can also be applied to a fluid pressure control device for adjusting fluid pressure of fluid pressure apparatuses mounted on a motor vehicle such as a steering apparatus and a suspension apparatus.

As is clear from the foregoing description of the fluid pressure control device of the present invention, the outlet valve for discharging working fluid from the fluid pressure apparatus or the control chamber is formed by a flow control valve. Since frequency of changeover between opening and closing of the outlet valve is quite high in the inlet valve, control performance of the outlet valve can be improved and operational noises of the outlet valve can be reduced by the flow control valve. Meanwhile, in the inlet valve provided in the supply path of working fluid from the fluid pressure source, sophisticated control is not required to be performed usually and thus, frequency of changeover between opening and closing is low. Therefore, adverse effect of use of the solenoid selector valve as the inlet valve on control performance and operational noises of the inlet valve is little.

Meanwhile, the flow control valve should be provided with the expensive current drive circuit for supplying variable drive current. In the present invention, since only one flow control valve is used as the outlet valve, only one current drive circuit is required to be used, thereby resulting in reduction of production cost of the fluid pressure control device. Namely, in the present invention, by employing the flow control valve and the solenoid selector valve as the outlet valve and the inlet valve, respectively, control performance of the fluid pressure control device can be improved at low cost.

What is claimed is:

1. A fluid pressure control device comprising:

an inlet valve which is provided in a supply path for connecting a fluid pressure apparatus and a fluid pressure source and is opened so as to increase fluid pressure of the fluid pressure apparatus; and an outlet valve which is provided in a discharge path for discharging working fluid from the fluid pressure apparatus and is opened so as to reduce the fluid pressure of the fluid pressure apparatus, the outlet valve including means for opening the outlet valve in response to drive current applied thereto;

wherein the inlet valve is formed by a solenoid selector valve effecting only a fully open operation and a fully closed operation;

wherein the outlet valve is formed by a flow control valve, the flow control valve being moved by the means for opening so that one-to-one correspondence continuously exists between quantity of drive current applied thereto and flow rate of the working fluid flowing therethrough; and wherein the inlet valve and the outlet valve are not open at the same time.

2. A fluid pressure control device comprising:

an inlet valve which is provided in a supply path for connecting a control chamber for adjusting fluid pressure of a fluid pressure apparatus and a fluid pressure source and is opened so as to increase fluid pressure of the control chamber; and an outlet valve which is provided in a discharge path for discharging working fluid from the control chamber and is opened so as to reduce the fluid pressure of the control chamber, the outlet valve including means for opening the outlet valve in response to drive current applied thereto;

wherein the inlet valve is formed by a solenoid selector valve effecting only a fully open operation and a fully closed operation;

wherein the outlet valve is formed by a flow control valve, the flow control valve being moved by the means for opening so that one-to-one correspondence continuously exists between quantity of drive current applied thereto and flow rate of the working fluid flowing therethrough; and wherein the inlet valve and the outlet valve are not open at the same time.

\* \* \* \* \*